US012643252B2

(12) United States Patent
Dong et al.

(10) Patent No.: US 12,643,252 B2
(45) Date of Patent: Jun. 2, 2026

(54) THREE-DIMENSIONAL ULTRASONIC ELLIPTICAL VIBRATION CUTTING DEVICE

(71) Applicant: DALIAN UNIVERSITY OF TECHNOLOGY, Dalian (CN)

(72) Inventors: Zhigang Dong, Dalian (CN); Renke Kang, Dalian (CN); Sen Yin, Dalian (CN); Yan'an Pan, Dalian (CN); Yan Bao, Dalian (CN)

(73) Assignee: DALIAN UNIVERSITY OF TECHNOLOGY, Dalian (CN)

(*) Notice: Subject to any disclaimer, the term of this patent is extended or adjusted under 35 U.S.C. 154(b) by 88 days.

(21) Appl. No.: 18/694,404

(22) PCT Filed: Dec. 20, 2021

(86) PCT No.: PCT/CN2021/139670
§ 371 (c)(1),
(2) Date: Mar. 21, 2024

(87) PCT Pub. No.: WO2023/097803
PCT Pub. Date: Jun. 8, 2023

(65) Prior Publication Data

US 2024/0391122 A1 Nov. 28, 2024

(30) Foreign Application Priority Data

Dec. 2, 2021 (CN) ........................ 202111460871.8

(51) Int. Cl.
*B26D 7/08* (2006.01)
*B06B 1/06* (2006.01)

(52) U.S. Cl.
CPC ............ *B26D 7/086* (2013.01); *B06B 1/0607* (2013.01)

(58) Field of Classification Search
CPC .............................. B06B 1/0607; B26D 7/086
(Continued)

(56) References Cited

U.S. PATENT DOCUMENTS 6,127,980 A 10/2000 Podgorski
2018/0250758 A1 9/2018 Jiang et al.

FOREIGN PATENT DOCUMENTS

CN 101259465 A 9/2008
CN 102120302 A 7/2011
(Continued)

OTHER PUBLICATIONS

Translation CN110976259 (Year: 2025).*
(Continued)

*Primary Examiner* — Nhat Chieu Q Do
(74) *Attorney, Agent, or Firm* — NKL Law; Allen Xue

(57) ABSTRACT

A three-dimensional ultrasonic elliptical vibration cutting device has a two-dimensional ultrasonic vibration transducer, an asymmetric ultrasonic horn, and a cutter. The cutter is installed at the output end of the asymmetric ultrasonic horn, the two-dimensional ultrasonic vibration transducer is used for outputting ultrasonic longitudinal-flexural complex vibration, the asymmetric ultrasonic horn is used for converting and decomposing longitudinal vibration output by the two-dimensional ultrasonic vibration transducer into second-phase flexural vibration and longitudinal vibration, and outputting a three-dimensional ultrasonic elliptical vibration trajectory on the cutter in combination with first-phase flexural vibration output by the two-dimensional ultrasonic vibration transducer. A three-dimensional ultrasonic elliptical vibration trajectory is output in a double-excitation mode. The output three-dimen-
(Continued)

sional ultrasonic elliptical vibration trajectory is adjusted according to different cutting applications and machining requirements.

5 Claims, 2 Drawing Sheets

(58) Field of Classification Search
USPC .............................................................. 83/701
See application file for complete search history.

(56) References Cited

FOREIGN PATENT DOCUMENTS

| | | | | | |
|---|---|---|---|---|---|
| CN | 203401087 | U | | 1/2014 | |
| CN | 204271947 | U | * | 4/2015 | |
| CN | 106239230 | A | | 12/2016 | |
| CN | 104439892 | B | * | 8/2017 | ........... B06B 1/0651 |
| CN | 108927572 | A | * | 12/2018 | ............... B06B 1/06 |
| CN | 110976259 | A | * | 4/2020 | ........... B06B 1/0603 |
| CN | 211940132 | U | | 11/2020 | |
| CN | 112170151 | A | | 1/2021 | |
| CN | 112872922 | A | | 6/2021 | |
| CN | 113182539 | A | | 7/2021 | |
| CN | 113334648 | A | | 9/2021 | |
| CN | 113510060 | A | | 10/2021 | |
| CN | 113510061 | A | | 10/2021 | |
| JP | 2005014186 | A | | 1/2005 | |
| JP | 2008212916 | A | | 9/2008 | |
| JP | 2011143517 | A | | 7/2011 | |

OTHER PUBLICATIONS

Translation CN-104439892-B (Year: 2026).*
Translation CN-204271947-U (Year: 2026).*
Yin, Sen et al.; "Development and optimization of ultrasonic elliptical vibration cutting device based on single excitation"; Journal of Manufacturing Science&Engineering, vol. 143, Aug. 2021; No. 8, pp. 081005-1 to 081005-10.

* cited by examiner

THREE-DIMENSIONAL ULTRASONIC ELLIPTICAL VIBRATION CUTTING DEVICE

TECHNICAL FIELD

The present invention relates to the technical field of ultrasonic vibration machining, in particular to a novel three-dimensional ultrasonic elliptical vibration cutting device.

BACKGROUND

Rapid development of precision and ultra-precision technology has attracted more and more attention to ultrasonic elliptical vibration cutting technology. Compared with one-dimensional ultrasonic vibration cutting, two-dimensional ultrasonic elliptical vibration has the characteristics such as friction inversion, variable-angle cutting, and more thorough cutter-workpiece separation, thereby effectively prolonging the service life of the cutter, improving the smoothness of the cutting surface and the cutting stability, and inhibiting burrs and regenerative chatter, etc.

Three-dimensional ultrasonic elliptical vibration cutting applies ultrasonic vibration in cutting speed direction, cutting depth direction, and cutting feeding direction, which not only has the advantage of two-dimensional ultrasonic elliptical vibration cutting, but also enables cutter to perform elliptical motion in the machined surface and pushes chips away, thereby reducing the friction between the chips and the front cutter surface. In addition, the ironing effect of the cutter in the machined surface further improves the surface precision.

However, three-dimensional ultrasonic elliptical vibratory cutting devices have problems such as a poor coupling effect between a variety of vibrations, large geometric dimension of the device, and high requirements for a three-channel ultrasonic power supply, resulting in its poor prospect for industrial applications, and hindering the development of three-dimensional ultrasonic elliptical vibration cutting technology. The present invention provides a novel three-dimensional ultrasonic elliptic vibration cutting device, using dual-channel ultrasonic power supply for excitation and having a relatively small geometric dimension, which is conductive to the industrial application of three-dimensional ultrasonic elliptical vibration cutting technology.

SUMMARY OF THE INVENTION

In order to give full play to the advantages of ultrasonic elliptical vibration cutting technology, the present invention provides a novel three-dimensional ultrasonic elliptical vibration cutting device, which has better adaptability. Technical solutions adopted by the present invention are as follows:

The novel three-dimensional ultrasonic elliptical vibration device includes a two-dimensional ultrasonic vibration transducer, an asymmetric ultrasonic horn, and a cutter. The cutter is installed at an output end of the asymmetric ultrasonic horn through a set bolt. The two-dimensional ultrasonic vibration transducer is configured to output ultrasonic longitudinal-flexural complex vibration. The asymmetric ultrasonic horn is configured to convert and decompose a longitudinal vibration output by the two-dimensional ultrasonic vibration transducer into a second-phase flexural vibration and a longitudinal vibration, and output a three-dimensional ultrasonic elliptical vibration trajectory on the cutter in combination with a first-phase flexural vibration output by the two-dimensional ultrasonic vibration transducer.

Further, the two-dimensional ultrasonic vibration transducer includes a preload bolt, a rear cover, a circular piezoelectric ceramic stack, a middle cover, a semi-circular piezoelectric ceramic stack, and a front cover. The rear cover, the circular piezoelectric ceramic stack, the middle cover, the semi-circular piezoelectric ceramic stack, and the front cover are fastened in sequence along an axis direction through the preload bolt.

Further, in the two-dimensional ultrasonic vibration transducer, the circular piezoelectric ceramic stack is disposed at a peak position of longitudinal vibration for energizing a second-order longitudinal vibration mode of the two-dimensional ultrasonic vibration transducer to make the transducer output the longitudinal vibration (along a v direction). The semi-circular piezoelectric ceramic stack is disposed at a wave node position of flexural vibration for energizing a sixth-order flexural vibration mode of the two-dimensional ultrasonic vibration transducer to make the transducer output the first-phase flexural vibration (along a x direction). The two piezoelectric ceramic stacks are energized by a two-phase ultrasonic excitation signal with a certain phase difference to make the transducer in a longitudinal-flexural complex vibration mode to output the longitudinal-flexural complex ultrasonic vibration (along a v-x direction).

Further, the circular piezoelectric ceramic stack, using a d33 working mode with higher working efficiency of piezoelectric ceramic, is composed of a circular piezoelectric ceramic sheet under the model number PZT-4 and an electrode sheet. The semi-circular piezoelectric ceramic stack, using a d33 working mode with higher working efficiency of piezoelectric ceramic, is composed of a semi-circular piezoelectric ceramic sheet under the model number PZT-4 and an electrode sheet, and the positive and negative electrodes of the semi-circular piezoelectric ceramic sheet are reversely arranged.

Further, an equation of the longitudinal-flexural complex ultrasonic vibration output by the two-dimensional ultrasonic vibration transducer satisfies:

$$\begin{cases} x(t) = A_x \sin(\omega t) \\ y(t) = A_y \sin(\omega t + \Delta\varphi_1) \end{cases} \quad (1)$$

wherein, $A_x$ represents an amplitude of the flexural vibration, $A_y$ represents an amplitude of the longitudinal vibration, ω represents an angular frequency of the ultrasonic vibration, and $\Delta\varphi_1$ represents a phase difference of the two-phase ultrasonic excitation signal energizing the two piezoelectric ceramic stacks, which is controlled by a dual-channel ultrasonic power supply.

Further, since the existence of an asymmetric structure, the asymmetric ultrasonic horn amplifies, decomposes and converts the longitudinal vibration output by the two-dimensional ultrasonic vibration transducer: a part of the longitudinal vibration is converted into a second-phase flexural vibration along a center of the asymmetric structure (along a z direction), while the other part of the longitudinal vibration continues to be transmitted forwards (along a y direction).

Further, a diameter of an input end of the asymmetric ultrasonic horn is smaller than a diameter of the two-dimensional ultrasonic vibration transducer, so as to amplify the ultrasonic vibration output by the transducer for the first time. The asymmetric structure is a stepped structure asymmetrically arranged relative to a rotating body and is configured to amplify the ultrasonic vibration for the second time.

Further, an ultrasonic vibration decomposition equation of the longitudinal vibration output by the two-dimensional ultrasonic vibration transducer on the asymmetric ultrasonic horn satisfies:

$$\begin{cases} y_1(t) = (1-\alpha)A_y\sin(\omega t + \Delta\varphi_1) \\ z(t) = \alpha A_y\sin(\omega t + \Delta\varphi_1 + \Delta\varphi_2) \end{cases} \quad (2)$$

wherein, $\Delta\varphi_2$ represents a phase difference between the longitudinal vibration and the second-phase flexural vibration, and $\alpha$ represents a ratio coefficient of conversion from the longitudinal vibration to the second-phase flexural vibration, wherein $\Delta\varphi_2$ and $\alpha$ are determined by the position and the geometric dimension of the asymmetric structure. The influence of asymmetric structure on the conversion mechanism of ultrasonic vibration, $\Delta\varphi_2$ and $\alpha$ can be referred to the paper of Development and optimization of ultrasonic elliptical vibration cutting device based on single excitation, Journal of Manufacturing Science & Engineering, Vol. 143, No 8, P. 081005, 2021, S. Yin, Z. Dong, Y. Bao, R. Kang, W. Du, Y. Pan, and Z. Jin.

Further, by calculating and optimizing a position and a geometric dimension of the asymmetric structure of the asymmetric ultrasonic horn, the ratio coefficient $\alpha$ of conversion of the longitudinal vibration to the second-phase flexural vibration and a phase difference $\Delta\varphi_2$ may be adjusted.

Further, the first-phase flexural vibration has no asymmetric structure on the transmission path of the asymmetric ultrasonic horn, so that the first-phase flexural vibration output by the transducer are only subject to amplification without vibration decomposition and conversion. Specifically, a center line of the asymmetric structure of the asymmetric ultrasonic horn is parallel to the splice line of the semi-circular piezoelectric ceramic sheet of the two-dimensional ultrasonic vibration transducer, so that the first-phase flexural vibration output by the two-dimensional ultrasonic vibration transducer has no asymmetric structure on the transmission path of the horn, thereby only amplifying the first-phase flexural vibration.

Further, after the longitudinal-flexural complex vibration output by the two-dimensional ultrasonic vibration transducer is amplified, decomposed and converted by the asymmetric ultrasonic horn, a longitudinal-flexural-flexural ultrasonic complex vibration is output on the cutter disposed at a tail end of the asymmetric ultrasonic horn. Since the three-phase ultrasonic vibration has a certain angle and a certain phase difference, the three-phase ultrasonic vibration may synthesize a three-dimensional ultrasonic elliptical vibration trajectory.

An equation of the three-dimensional ultrasonic elliptical vibration trajectory output on the cutter satisfies:

$$\begin{cases} x(t) = A_x\sin(\omega t) \\ y_1(t) = (1-\alpha)A_y\sin(\omega t + \Delta\varphi_1) \\ z(t) = \alpha A_y\sin(\omega t + \Delta\varphi_1 + \Delta\varphi_2) \end{cases} \quad (3)$$

Further, by means of adjusting a voltage and the phase difference of the two-phase excitation signal of the two-dimensional ultrasonic vibration transducer and the asymmetric structure of the horn, the three-dimensional ultrasonic elliptical vibration trajectory output by the device may be adjusted.

The present invention has the following advantages:

The device of the present invention, based on a two-dimensional ultrasonic vibration transducer having a second-order longitudinal vibration mode and a sixth-order flexural vibration mode, performs amplification, decomposition, and conversion on the ultrasonic vibration by using an asymmetric ultrasonic horn, and finally outputs a three-dimensional ultrasonic elliptical vibration trajectory on the cutter. The present invention adopts a two-phase ultrasonic signal for excitation, avoiding the problems of difficult development of the three-phase ultrasonic power supply and the like, which not only has the advantages of the two-dimensional ultrasonic elliptical vibration cutting technology, but also the three-dimensional ultrasonic elliptical vibration enables the cutter to do elliptical motion in the machined surface and pushes the chips away, reducing the friction between the chips and the front cutter surface. In addition, surface precision is further improved by the ironing effect of the cutter in the machined surface. The three-dimensional ultrasonic elliptical vibration trajectory output by the device of the present invention can be controlled and adjusted by a dual-channel ultrasonic power supply, so that the cutting device can meet different cutting applications and processing requirements, having better adaptability. Based on the above reasons, the present invention can be widely popularized in the technical field of ultrasonic vibration processing.

DETAILED DESCRIPTION OF DRAWINGS

In order to more clearly illustrate the technical solution in the embodiment of the present invention or the prior art, the following is a brief introduction of the accompanying drawings required to be used in the description of the embodiment or the prior art. Obviously, the accompanying drawings in the description below are some embodiments of the present invention. For those ordinary in the art, other accompanying drawings can also be obtained from these accompanying drawings without creative labor.

In the figures: 1. two-dimensional vibration transducer, 2. asymmetric ultrasonic horn, 3. diamond cutter, 4. preload bolt, 5. rear cover, 6. silver electrode sheet of circular piezoelectric ceramic stack, 6A and 6B. silver electrode sheet, 7. circular piezoelectric ceramic stack, 7A and 7B. circular piezoelectric ceramic sheet, 8. middle cover, 9. silver electrode sheet of semi-circular piezoelectric ceramic stack, 9A and 9B. silver electrode sheet, 10. semi-circular piezoelectric ceramic stack, 10A, 10B, 10C and 10D. semi-circular piezoelectric ceramic sheet, 11. front cover, 12. asymmetric structure, 13. set bolt.

DETAILED DESCRIPTION OF PREFERRED EMBODIMENTS

To make the objectives, technical solutions, and advantages of the present invention clearer, the following clearly and completely describes the technical solutions in the embodiments of the present invention with reference to the accompanying drawings in the embodiments of the present invention. Apparently, the described embodiments are merely some rather than all of the embodiments. The following description of at least one exemplary embodiment is actually only illustrative, and in no way serves as any limitation on the present invention and its application or use. Based on the embodiments of the present invention, all the other embodiments obtained by those of ordinary skill in the art without inventive effort are within the protection scope of the present invention.

Figure 1:
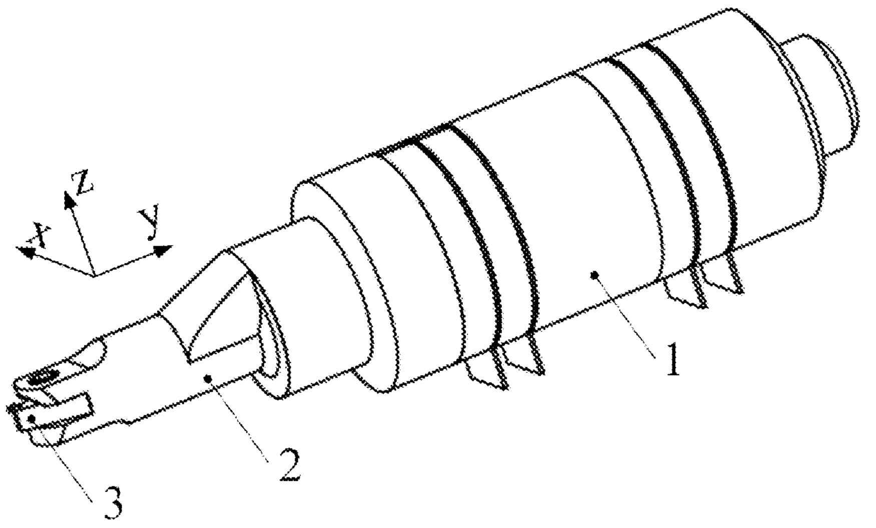
FIG. 1 is a schematic diagram of a main body structure in a coordinate system according to an embodiment of the present invention.

As shown in FIG. 1, a novel three-dimensional ultrasonic elliptical vibration device of the present invention is provided, including a two-dimensional ultrasonic vibration transducer 1, an asymmetric ultrasonic horn 2, and a diamond cutter 3.

Figure 2:
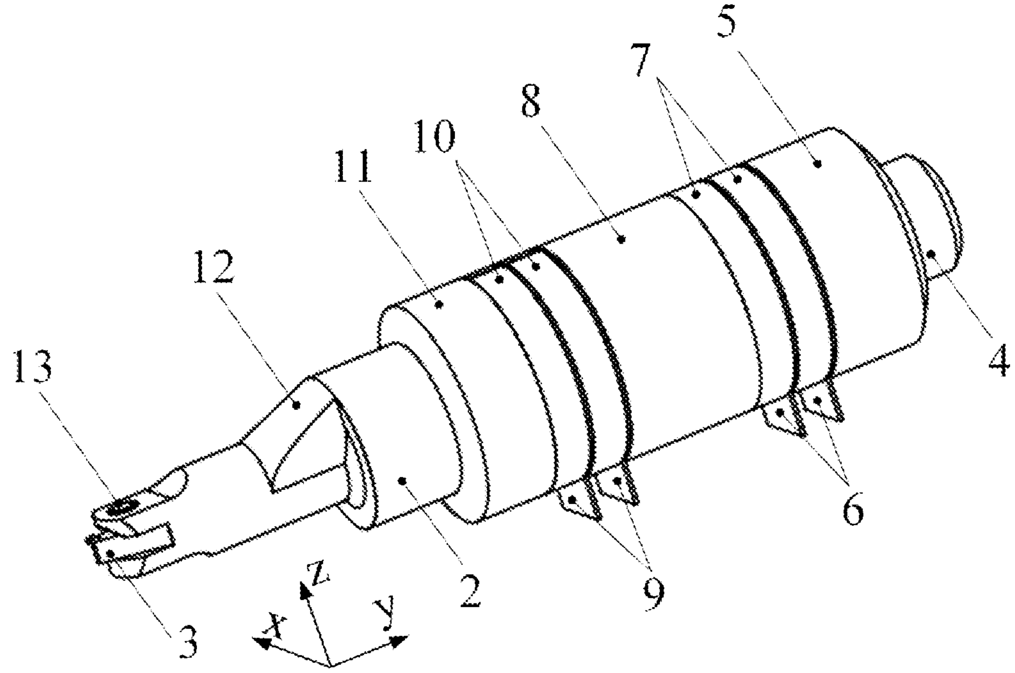
FIG. 2 is a schematic diagram of a main body structure according to an embodiment of the present disclosure.
Figure 3:
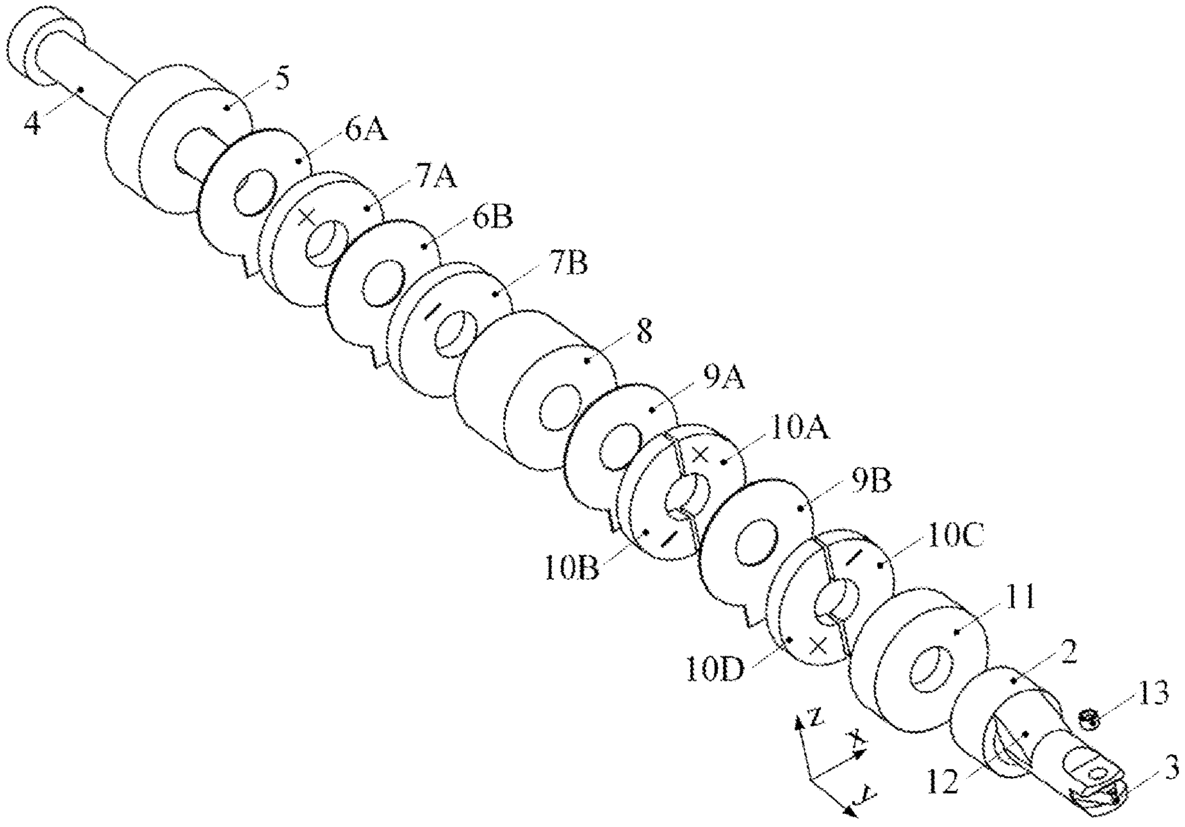
FIG. 3 is an exploded view of a main structure according to an embodiment of the present invention.

As shown in FIGS. 2 and 3, the two-dimensional ultrasonic vibration transducer 1 includes a preload bolt 4, a rear cover 5, silver electrode sheets 6A and 6B, circular piezoelectric ceramic sheets 7A and 7B, a middle cover 8, silver electrode sheets 9A and 9B, semi-circular piezoelectric ceramic sheets 10A, 10B, 10C and 10D, and a front cover 11.

As shown in FIG. 2, the two groups of piezoelectric ceramic stacks 7 and 10 of the dimensional ultrasonic vibration transducer 1 are both the Model PZT-4 piezoelectric ceramics, belonging to a sandwich-type ultrasonic transducer, which uses a d33 working mode with higher working efficiency of piezoelectric ceramic.

As shown in FIG. 3, the positive and negative electrodes of the semi-circular piezoelectric ceramic sheets 10A, 10B, 10C and 10D should be inversely arranged, so as to make the piezoelectric ceramic stacks stretch and expand simultaneously.

As shown in FIG. 2, the two-dimensional ultrasonic vibration transducer 1 is energized by a two-phase ultrasonic excitation signal with the same frequency and a certain phase difference, so that the two-dimensional ultrasonic vibration transducer 1 presents a longitudinal-flexural complex vibration mode, and outputs ultrasonic longitudinal-flexural complex vibration. By adjusting the voltage and phase difference of the two-phase excitation signal, the complex vibration output by the transducer 1 may be adjusted, thereby changing the shape of the three-dimensional ultrasonic elliptical vibration trajectory output by the device of the present invention.

As shown in FIG. 2, the asymmetric ultrasonic horn 2 is connected to the two-dimensional ultrasonic vibration transducer 1 through the preload bolt 4. The asymmetric structure 12 converts and decomposes the longitudinal vibration output by the transducer 1 into a second-phase flexural vibration and a longitudinal vibration, and to output a three-dimensional ultrasonic elliptical trajectory on the diamond cutter 3 in combine with a first-phase flexural vibration output by the transducer 1. By design of the position and geometric size of the asymmetric structure 12, the ratio of conversion from the longitudinal vibration to the second-phase flexural vibration may be adjusted, thereby affecting the shape of the three-dimensional ultrasonic elliptical vibration trajectory output by the present invention.

As shown in FIG. 3, the center line of the asymmetric structure 12 of the asymmetric ultrasonic horn 2 is parallel to the splice line of the semi-circular piezoelectric ceramic sheets 10A, 10B, 10C and 10D of the two-dimensional ultrasonic vibration transducer (along the v direction), so that the first-phase flexural vibration output by the two-dimensional ultrasonic vibration transducer has no asymmetric structure on the transmission path of the horn, thereby only amplifying the first-phase flexural vibration without vibration mode conversion.

As shown in FIG. 3, before assembly, the asymmetric ultrasonic horn 2, the diamond cutter 3, the preload bolt 4, the rear cover 5, the silver electrode sheets 6A and 6B, the circular piezoelectric ceramic sheets 7A and 7B, the middle cover 8, the silver electrode sheets 9A and 9B, the semi-circular piezoelectric ceramic sheets 10A, 10B, 10C and 10D, the front cover 11, and the set bolt 13 should be washed with absolute ethyl alcohol and dried with an air drying oven. The parts of the preload bolt 4 where contacting the rear cover 5, the silver electrode sheets 6A and 6B, the circular piezoelectric ceramic sheets 7A and 7B, the middle cover 8, the silver electrode sheets 9A and 9B, and the semi-circular piezoelectric ceramic sheets 10A, 10B, 10C and 10D should be wrapped with an insulating tape. The epoxy resin adhesive should be applied between the contact surfaces of the rear cover 5, the silver electrode sheets 6A and 6B, the circular piezoelectric ceramic sheets 7A and 7B, the middle cover 8, the silver electrode sheets 9A and 9B, and the semi-circular piezoelectric ceramic sheets 10A, 10B, 10C, and 10D.

As shown in FIG. 2, the diamond cutter 3 is fixed at the foremost end of the asymmetric ultrasonic horn 2 through the set bolt 13.

As shown in FIG. 3, the rear cover 5, the silver electrode sheet 6A, the circular piezoelectric ceramic sheet 7A, the silver electrode sheet 6B, the circular piezoelectric ceramic sheet 7B, the middle cover 8, the silver electrode sheet 9A, the semi-circular piezoelectric ceramic sheets 10A and 10B, the silver electrode sheet 9B, the semi-circular piezoelectric ceramic sheets 10C and 10D, and the front cover 11 are fastened in sequence along the axial direction by the preload bolt 4. In one embodiment, a preload of 120 N is applied, and heat preservation and aging treatment are performed.

The diameter of the input end of the asymmetric ultrasonic horn 2 is smaller than the diameter of the two-dimensional ultrasonic vibration transducer 1, so as to amplify the ultrasonic vibration output by the transducer 1 for the first time. The asymmetric ultrasonic horn 2 further has a stepped structure, so that the ultrasonic vibration can be amplified for the second time. The three-dimensional ultrasonic elliptical vibration cutting device of the present invention has a multistage amplification function, which can increase the output amplitude, effectively improving the processing efficiency of ultrasonic elliptical vibration cutting.

At last, it should be noted that the above various embodiments are merely intended to illustrate the technical solution of the present invention and not to limit the same; although the present invention has been described in detail with reference to the foregoing embodiments, it should be understood by those ordinary skilled in the art that the technical solutions described in the foregoing embodiments can be modified or equivalents can be substituted for some or all of the technical features thereof; and the modification or substitution does not make the essence of the corresponding technical solution deviate from the scope of the technical solution of each embodiment of the present invention.

The invention claimed is:

1. A three-dimensional ultrasonic elliptical vibration cutting device, comprising a two-dimensional ultrasonic vibration transducer, an asymmetric ultrasonic horn comprising an asymmetric structure, and a cutter, wherein:

the cutter is installed at an output end of the asymmetric ultrasonic horn through a set bolt, the two-dimensional ultrasonic vibration transducer is configured to output an ultrasonic longitudinal-flexural complex vibration that comprises a first-phase flexural vibration along a x-direction and a longitudinal vibration along a y-direction, the asymmetric ultrasonic horn is configured to decompose the longitudinal vibration output by the two-dimensional ultrasonic vibration transducer into a first part and a second part, and to transmit the first part of the longitudinal vibration along the y-direction, and to convert the second part of the longitudinal vibration into a second-phase flexural vibration along a z-direction, and to output a three-dimensional ultrasonic elliptical vibration trajectory on the cutter in combination with the first-phase flexural vibration output by the two-dimensional ultrasonic vibration transducer, and wherein a diameter of an input end of the asymmetric ultrasonic horn is smaller than a diameter of the two-dimensional ultrasonic vibration transducer, and the asymmetric ultrasonic horn comprises the asymmetric structure, the asymmetric structure is a stepped structure asymmetrically arranged between the input end and a tip end of the asymmetric ultrasonic horn relative to a rotating body and is configured to amplify the ultrasonic vibration.

2. The three-dimensional ultrasonic elliptical vibration cutting device according to claim 1, wherein the two-dimensional ultrasonic vibration transducer comprises a preload bolt, a rear cover, a circular piezoelectric ceramic stack, a middle cover, a semi-circular piezoelectric ceramic stack, and a front cover that are fastened in sequence through the preload bolt along the y-direction.

3. The three-dimensional ultrasonic elliptical vibration cutting device according to claim 1, wherein a ratio of conversion from the longitudinal vibration to the second-phase flexural vibration is adjustable by changing a position and a geometric dimension of the asymmetric structure of the asymmetric ultrasonic horn.

4. The three-dimensional ultrasonic elliptical vibration cutting device according to claim 1, wherein the center line of the asymmetric structure of the asymmetric ultrasonic horn is parallel to a splice line of the semi-circular piezoelectric ceramic sheet of the two-dimensional ultrasonic vibration transducer, so that the first-phase flexural vibration output by the two-dimensional ultrasonic vibration transducer has no asymmetric structure on a transmission path of the asymmetric ultrasonic horn, thereby only amplifying the first-phase flexural vibration.

5. The three-dimensional ultrasonic elliptical vibration cutting device according to claim 1, wherein the output thereof is adjustable by adjusting a voltage and the phase difference of the two-phase excitation signal of the two-dimensional ultrasonic vibration transducer and the asymmetric structure of the asymmetric ultrasonic horn.

* * * * *